U.S. Patent Office
3,450,711
Patented June 17, 1969

3,450,711
BIS-IMIDE CONTAINING DIEPOXIDE
COMPOUNDS
Ignazio Salvatore Megna, Somerville, N.J., and John Christos Petropoulos, Norwalk, Conn., assignors to American Cyanamid Company, Stamford, Conn., a corporation of Maine
No Drawing. Filed July 1, 1965, Ser. No. 468,964
Int. Cl. C07d 27/74, 99/04; C09j 3/14
U.S. Cl. 260—326
8 Claims

ABSTRACT OF THE DISCLOSURE

A novel class of bis-imide intermediates containing di-epoxy groups prepared by reacting certain acid anhydrides and organic diamines which are then reacted with peracids to produce diepoxide compounds containing a bis-imide structure.

The present invention concerns the discovery of certain new crystalline di-epoxide compounds containing an imide group thereon. These novel chemical compositions have demonstrated improved properties of adhesion and chemical resistance for improvement of epoxy resin type molding and adhesive compositions.

It is a particular purpose of this invention therefore, to describe a unique class of bis-imide intermediates prepared as reaction porducts of acid anhydrides and organic diamines which are capable of further reaction with peracids to yield new di-epoxides containing a bis-imide structure yet high reactivity. The presence of the imide group in the di-epoxide reaction product will increase the properties of thermal stability, toughness, rigidity, chemical resistance and high heat distortion temperature of the di-epoxides. The cyclic epoxy group in the molecule contributes high reactivity and adhesive properties.

The ultimate reaction products of this invention as generically illustrated by the structural formula below, they will find utility in epoxy type resinous molding compositions where they will contribute the aforesaid qualities of chemical resistance, hardness, rigidity and stability under conditions of high temperature stress.

Accordingly, our invention in its first product aspect, relates to certain novel bis-imide intermediates which may be represented by the general structure:

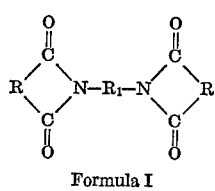

Formula I wherein R represents an olefinic substituent selected from the group consisting of those of the structure:

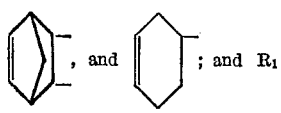
, and ; and $R_1$ represents a substituent selected from the group consisting of those of the structure:

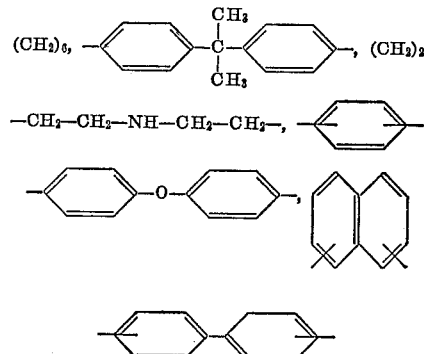

and

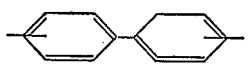

These intermediates may be formed by recourse to the general reaction between a suitable acid anhydride and a diamine which reaction may be illustrated by the following general reaction scheme:

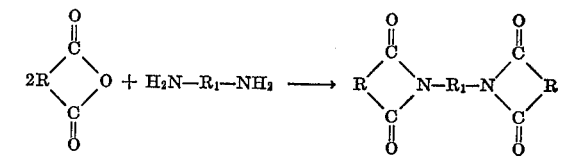

wherein R and $R_1$ are as defined above. The reaction involves melting the anhydride in some cases and holding at about 110 to 120° C. followed by addition of the diamine with agitation of the reaction mixture. The reaction temperature varies from about 150 to about 200° C. during the entire course of the reaction. The reaction time is in the order of about two to three hours. The product ultimately resulting after conventional purification techniques has the physical attributes of being a solid crystalline mass of varying colors or lack of the same depending upon the particular member prepared.

In a second product aspect, the invention in our discovery, also involves the reaction products of the aforesaid bis-imides with an epoxidizing agent such as peracetic acid as one of many of such agents useful in this regard. The products thus resulting may be represented by the following general formula:

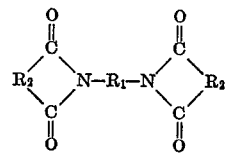

Formula II wherein $R_1$ is as defined above and $R_2$ represents a structural configuration selected from the group of (c) and (d)

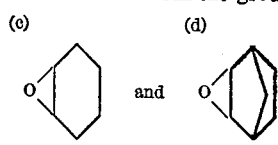

These compounds are formed by reaction of the bis-imides of Formula I with a suitable epoxidizing agent such as peracetic acid for about 4 hours at 10–20° C. and then at room temperature for about 15 hours. After conventional purification the final product is obtained which upon infrared spectral analysis is shown to conform with the graphic structure postulated for the materials. A typical preparation may be illustrated by the following reaction between the bis-imide of hexamethylene diamine-$\Delta^{4,5}$-tetrahydrophthalic anhydride and an epoxidizing agent (peracetic acid) the reaction goes to wit:

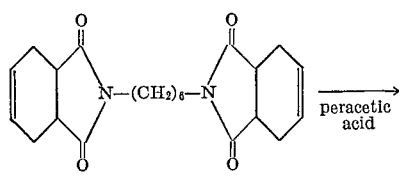

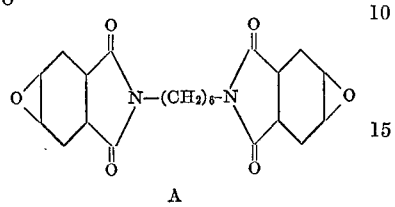

A

The product A recovered has all of the chemical properties enumerated above for the aforesaid compounds and the graphic structure postluated for the material has been confirmed by spectral analysis. While in the foregoing typical reaction peracetic acid has been illustrated, it is of course, to be understood that any of a great number of epoxidizing agents known to the art may be employed with equally advantageous results. In other words, the epoxidization of the bis-imide with any specific epoxidizing agent is not held to be critical to the invention.

The polymeric materials ultimately prepared by addition of the instant compounds will be tough, hard, generally fusible materials with outstanding thermal and oxidative stability. In this regard, they find use as encapsulating resins, molding compositions, adhesives, laminating resins, surface coating resins and the like.

Our inventive concept and its reduction to practice will be more concretely illustrated by the following several selected examples of our mode of manufacture of our novel compositions. The amounts of ingredients employed is expressed in parts by weight unless otherwise indicated. It is, of course, to be understood that these examples are purely for the purpose of exemplifying the concept of the invention.

PREPARATION OF BIS-IMIDES.—EXAMPLE 1

N,N hexamethylene bis(4-cyclohexene-1,2-dicarboximide)

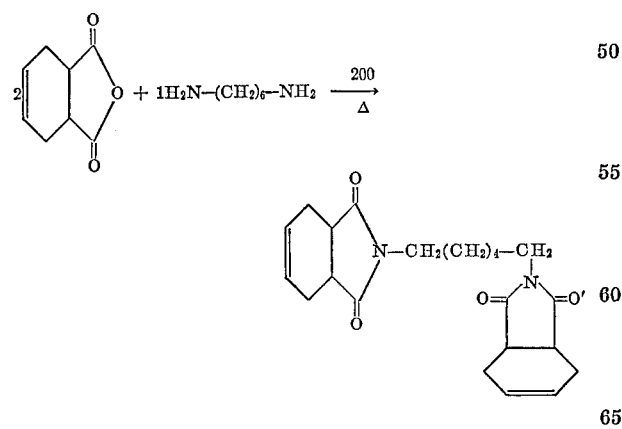

760 parts of $\Delta^{4,5}$-tetrahydrophthalic anhydride are placed in a 3-neck flask equipped with a mechanical stirrer, thermometer; nitrogen gas inlet tube and a Dean-Stark trap with water condenser. The anhydride is melted and kept at 110 to 120° C. The diamine is then added to the anhydride with rapid stirring, maintaining the temperature at 150–170° C. A moderate exotherm accompanies each addition of amine. When all the amine has been added, heating is continued and the temperature is kept between 180 and 200° C. until 90 parts of water are evolved (2 to 3 hours). The resulting liquid is cooled to a crystalline mass. A recrystallization from acetonitrile affords a colorless crystalline solid which melts at 136–137° C. The infrared spectrum shows peaks at 1775 (medium) and 1710 cm.$^{-1}$ (strong) which are characteristic of an imide group.

Analysis.—Calc'd: C, 68.7; H, 7.34; N, 7.28. Found: C, 68.6; H, 7.48; N, 7.09.

EXAMPLE 2

N,N (isopropylidene di-p-phenylene) bis(4-cyclohexene)1,2-dicarboximide

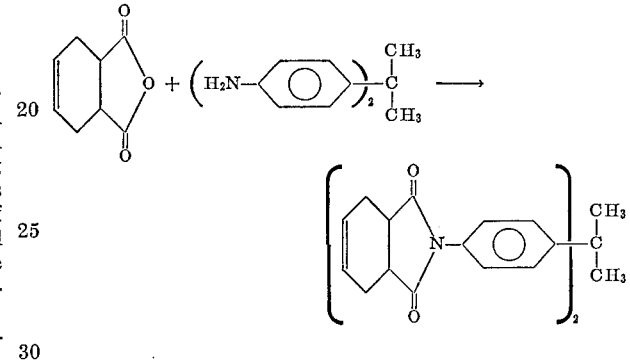

60 parts of bis-aniline and 80.6 parts of $\Delta^{4,5}$-tetrahydrophthalic anhydride were intimately mixed in a mortar and placed in a flask (see Example 1). The reaction mixture is heated up to a temperature of 275° C. until 9.5 parts of water are evolved (2 to 3 hours). The clear yellow liquid is allowed to cool to a crystalline mass. The bis-imide thus obtained may be recrystallized from acetonitrile. M.P.=247–248.5.

Analysis.—Calc'd: C, 75.3; H, 6.12; N, 5.66. Found: C, 75.1; H, 6.33; N, 5.97.

EXAMPLE 3

N,N-(isopropylidene-di-p-phenylene) bis-(5-norbornene-2,3-dicarboximide)

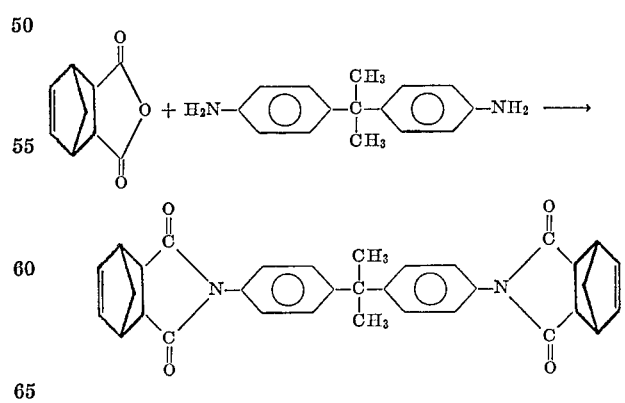

60 parts of bis-aniline and 86.9 parts of Nadic® anhydride[1] are intimately mixed and reacted according to Example 2. The crystalline solid which is obtained may be recrystallized from dimethylsulfoxide or dimethylformamide to give a colorless crystalline solid which melts at 296–298° C.

---
[1] Endo-cis-bicyclo[221]-5-heptene-2,3-dicarboxylic anhydride.

EXAMPLE 4

N,N dimethylene bis(4-cyclohexene-1,2-dicarboximide)

304 parts of Δ$^{4,5}$-tetrahydrophthalic anhydride and 60 parts of ethylenediamine are reacted according to the procedure in Example 1 with the exception that the reaction is allowed to proceed until 36 parts of water are evolved. The crystalline solid which results is recrystallizable from acetonitrile to give colorless crystalline platlets which melt at 236–237° C.

EXAMPLE 5

N,N' diethylene bis(5-norbornene-2,3-dicarboximide)

328 parts of nadic anhydride and 103 parts of diethylene triamine are reacted using the procedure in Examples 1 and 2 until 36 parts of water are evolved (1 to 1.5 hours). A glass was obtained which softens at 55–60° C.

PREPARATION OF THE DI-EPOXIDE.—EXAMPLE 6

N,N' hexamethylene bis(4,5-epoxy-1,2-cyclohexane dicarboximide)

192 parts of bis-imide, 190 parts of 40% peracetic acid, 300 parts of chloroform, 10 parts of sodium acetate are charged to a 3-necked flask, equipped with a mechanical stirrer and a thermometer and the reaction mixture is allowed to stand at 10 to 20° C. with stirring for 4 hours and then at room temperature for 15 hours. The white solid which crystallizes out of solution is collected by filtration and dried. The chloroform solution was diluted with chloroform and washed with water until the water extract was neutral to litmus. The chloroform was removed by flask evaporation. The resulting crystalline solid was combined with the solid obtained above and it was recrystallized from acetonitrile affording a solid melting at 229–230° C. The infrared spectrum shows peaks at 1775 cm.$^{-1}$ (medium) and at 1710 cm.$^{-1}$ (strong) which are characteristic of the imide grouping. A strong peak at 790 cm.$^{-1}$ is present which is characteristic of the epoxy grouping attached to a six-membered ring.

*Analysis.*—Calc'd: C, 63.5; H, 6.77; N, 6.72. Found: C, 63.6; H, 6.70; N, 6.54.

EXAMPLE 7

324 parts of nadic anhydride and 60 parts of ethylene diamine are reacted by the same procedure as in Example 1. A crystalline solid was obtained from acetonitrile which melted at 236–238° C.

EXAMPLE 8

Cure of the di-epoxide 105 parts of the dianhydride of cyclopentanetetracarboxylic acid and 208 parts of the di-epoxide were blended and heated to 200° C. at which point the blend gelled to a hard infusible mass.

EXAMPLE 9

Treat 100 parts of pyromellitic anhydride and 208 parts of the di-epoxide by the same procedure as in Example 8 above. The blend gelled to an infusible mass within three minutes.

EXAMPLE 10

N,N'(oxy-di-p-phenylene)bis(4-cyclohexane-1,2-dicarboxyimide)

100 parts of p,p'-diaminodiphenylether and 152 parts of tetrahydrophthalic anhydride are intimately admixed in a mortar and placed in a flask. The reaction mixture is heated to a temperature of 275° C. until 18 parts of water are evolved. This takes from 2 to 3 hours. The product of this example crystallizes out on cooling and has the graphic structure:

EXAMPLE 11

N,N'(oxy-di-p-phenylene)bis(5-norbornene-2,3-dicarboxyimide)

100 parts of p,p'-diaminodiphenylether and 164 parts of 5 norbornene-2,3 dicarboxylic anhydride are intimately admixed in a mortar and placed in a flask. The reaction mixture is heated to a temperature of 275° C. until 18 parts of water are evolved (about 2 to 3 hours). The product of this example crystallizes out upon cooling and may be represented by the graphic structure:

EXAMPLE 12

N,N'(methylene-di-p-phenylene)bis(4-cyclohexene-1,2-dicarboxyimide)

Admix 99 parts of p,p'-diaminodiphenylmethane and 152 parts of tetrahydrophthalic anhydride in a mortar and place in a flask. The reaction mixture is heated to a temperature of 275° C. until 18 parts of water are evolved (about 2–3 hours). The product of this example crystallizes out upon cooling and may be represented by the following graphic structure:

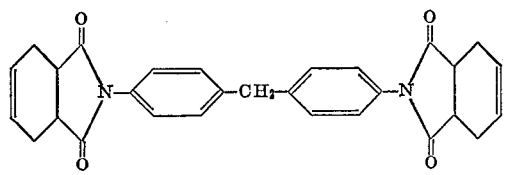

EXAMPLE 13

N,N'(methylene-di-p-phenylene)bis(5-norbornene-2,3-dicarboxyimide)

Admix 99 parts of p,p'-diaminodiphenylmethane and 164 parts of 5-norbornene-2,3-dicarboxylic anhydride in a mortar and place in a flask. The reaction mixture is heated to a temperature of 275° C. until 18 parts of water are evolved (about 2–3 hours). The product of this example crystallizes out upon cooling and may be represented by the following graphic structure:

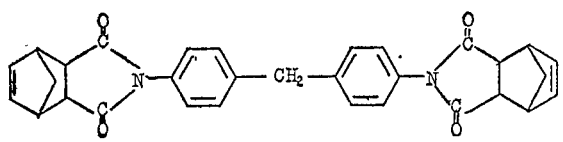

EXAMPLE 14

N,N'(di-p-phenylene)bis(4-cyclohexene-1,2-dicarboxyimide)

Admix 92 parts of p,p'-diaminodiphenyl and 152 parts of tetrahydrophthalic anhydride in a mortar and place in a flask. The reaction mixture is heated to a temperature of 275° C. until 18 parts of water are evolved (about 2–3 hours). The product of this example crystallizes out upon cooling and may be represented by the following graphic structure:

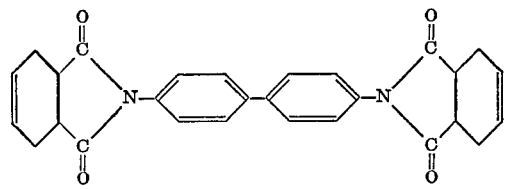

EXAMPLE 15

N,N'(di-p-phenylene)bis(5-norbornene-2,3-dicarboxyimide)

Admix 92 parts of p,p'-diaminodiphenyl and 164 parts of 5-norbornene-2,3-dicarboxylic anhydride in a mortar and place in a flask. The reaction mixture is heated to a temperature of 275° C. until 18 parts of water are evolved (about 2–3 hours). The product of this example crystallizes out upon cooling and may be represented by the following graphic structure:

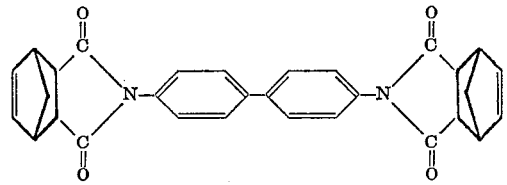

EXAMPLE 16

N,N'(1,3-phenylene)bis(4-cyclohexene-1,2-dicarboxyimide)

Admix 54 parts of m-phenylene diamine and 152 parts of tetrahydrophthalic anhydride in a mortar and place in a flask. The reaction mixture is heated to a temperature of 275° C. until 18 parts of water are evolved (about 2–3 hours). The product of this example crystallizes out upon cooling and may be represented by the following graphic structure:

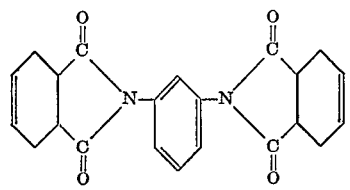

EXAMPLE 17

N,N'(1,3-phenylene)bis(5-norbornene-2,3-dicarboxyimide)

Admix 54 parts of m-phenylene diamine and 164 parts of 5-norbornene-2,3-dicarboxylic anhydride in a mortar and place in a flask. The reaction mixture is heated to a temperature of 275° C. until 18 parts of water are evolved (about 2–3 hours). The product of this example crystallizes out upon cooling and may be represented by the following graphic structure:

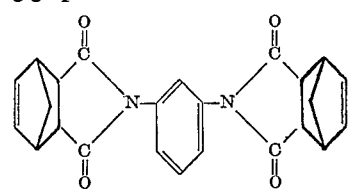

EXAMPLE 18

N,N'(1,4-phenylene)bis(4-cyclohexene-1,2-dicarboxyimide)

Admix 54 parts of p-phenylene diamine and 152 parts of tetrahydrophthalic anhydride in a mortar and place in a flask. The reaction mixture is heated to a temperature of 275° C. until 18 parts of water are evolved, (about 2–3 hours). The product of this example crystallizes out upon cooling and may be represented by the following graphic structure:

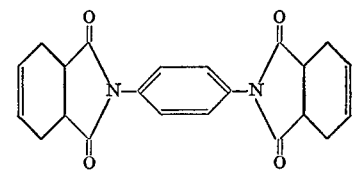

EXAMPLE 19

N,N'(1,4-phenylene)bis(5-norbornene-2,3-dicarboxyimide)

Admix 54 parts of p-phenylene diamine and 164 parts of 5-norbornene-2,3-dicarboxylic anhydride in a mortar and place in a flask. The reaction mixture is heated to a temperature of 275° C. until 18 parts of water are evolved, (about 2–3 hours). The product of this example crystallizes out upon cooling and may be represented by the following graphic structure:

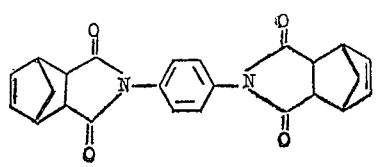

What is claimed is:
1. A compound having the structure:

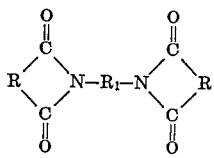

wherein R represents a structural configuration selected from the group consisting of those of the structure:

(a)
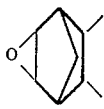

and (b)
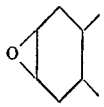

and $R_1$ represents a functional group selected from the group consisting of $(CH_2)n$ wherein $n$ is a whole integer from 2 to 6,

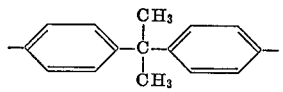

and $(CH_2)_2-NH-(CH_2)_2$, 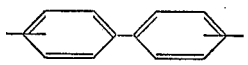

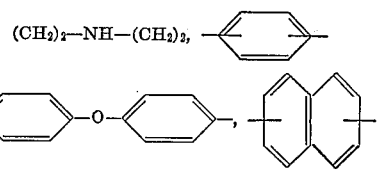

and

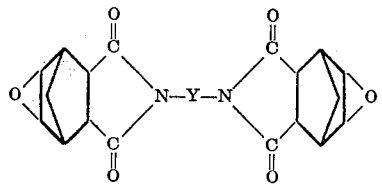

2. N,N'-(isopropylidene) di-p-phenylene-bis (4-cyclohexene 1,2-dicarboximide).

3. N,N'-(isopropylidene di-p-phenylene)bis (5-norbornene-2,3-dicarboximide).

4. A compound of the formula

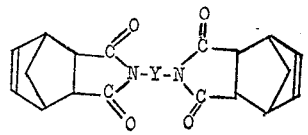

wherein Y is a member of the group consisting of arylene and aryleneoxyarylene, wherein the arylene group is hydrocarbon containing from 6 to 12 carbon atoms, having no olefinic or acetylenic substituents and linked through a nuclear carbon to the remainder of the molecule.

5. A compound of the formula

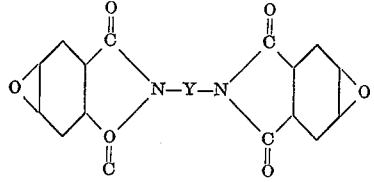

wherein Y is a member of the group consisting of arylene and aryleneoxyarylene, wherein the arylene group is hydrocarbon containing from 6 to 12 carbon atoms, having no olefinic or acetylenic substituents and linked through a nuclear carbon to the remainder of the molecule.

6. A compound of the formula

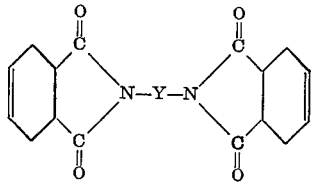

wherein Y is a member of the group consisting of arylene and aryleneoxyarylene, wherein the arylene group is hydrocarbon containing from 6 to 12 carbon atoms, having no olefinic or acetylenic substituents and linked through a carbon atom to the remainder of the molecule.

7. A compound of the formula wherein Y is a member of the group consisting of arylene and aryleneoxyarylene, wherein the arylene group is hydrocarbon containing from 6 to 12 carbon atoms, having no olefinic or acetylenic substituents and linked through a nuclear carbon to the remainder of the molecule.

8. N,N'-hexamethylene bis(4,5-epoxy-1,2-cyclohexane dicarboximide).

References Cited

UNITED STATES PATENTS 2,545,283  3/1951  Johnson _____ 260—326
2,863,801  12/1958  Kuhle et al. _____ 260—326

OTHER REFERENCES

Bailey et al., Jour. Org. Chem., vol. 27, 1962, pp. 75–1978 QD241-J6.

Furdik et al., Chem. Abstracts, vol. 60, March 1964, pp. 7929–7930 QDI-A51.

Stille et al., Jour. Org. Chem., vol. 26, 1961, pp 4026–4029 QD241-J6.

ALEX MAZEL, Primary Examiner.

J. A. MARCAVAGE, Assistant Examiner.

U.S. Cl. X.R.

117—161; 161—184; 260—2, 47, 830

UNITED STATES PATENT OFFICE
CERTIFICATE OF CORRECTION

Patent No. 3,450,711                                            June 17, 1969

Ignazio Salvatore Megna et al.

It is certified that error appears in the above identified patent and that said Letters Patent are hereby corrected as shown below:

Column 1, line 30, "porducts" should read -- products --; lines 66 to 70, the right-hand structure should appear as shown below:

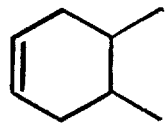

Column 2, lines 16 and 17, the bottom structure should appear as shown below:

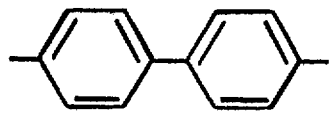

Column 3, line 21, "postluated" should read -- postulated --; lines 55 to 64, the right-hand portion of the formula should appear as shown below:

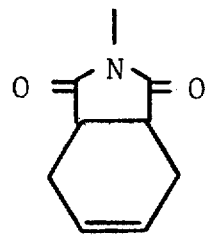

Column 10, lines 15 to 22, the formula should appear as shown below:

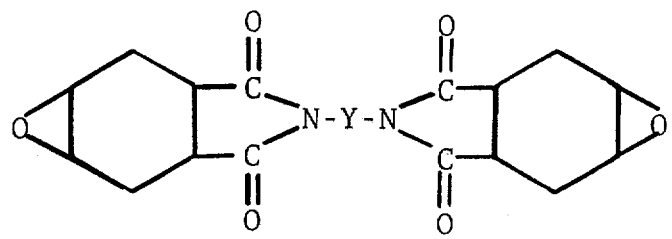

Signed and sealed this 28th day of April 1970.

(SEAL)
Attest:

EDWARD M. FLETCHER, JR.　　　　　　　　　WILLIAM E. SCHUYLER, JR.
Attesting Officer　　　　　　　　　　　　Commissioner of Patents